Jan. 12, 1960        F. T. ROWLAND ET AL        2,920,884
LEAF SPRING INSERT
Filed Nov. 4, 1955                               2 Sheets-Sheet 1

INVENTORS.
Frederick T. Rowland
Willard F. Perdue
BY Webb, Mackey & Burden
THEIR ATTORNEYS

United States Patent Office 2,920,884
Patented Jan. 12, 1960

2,920,884

LEAF SPRING INSERT

Frederick T. Rowland, New Wilmington, and Willard F. Perdue, New Castle, Pa., assignors to Rockwell-Standard Corporation, a corporation of Pennsylvania Application November 4, 1955, Serial No. 544,988

5 Claims. (Cl. 267—49)

The present invention relates to interliner structure for leaf springs, and especially to part length liners which are more commonly termed inserts, for such springs.

One form of leaf load spring consists of a stack of successive metallic spring plates each of which has an end extending beyond the corresponding end of the next preceding plate. As a means of preventing the plates from rubbing together in metal to metal contact, particularly at their corresponding adjacent ends, full length or part length liners of non-metallic material are inserted between the plates at least for a length sufficient to separate them at their ends. In the past, non-metallic materials inserted for this purpose between adjacent spring plates have included waxed paper, fabric, and plastics which are sometimes additionally lubricant impregnated or else additionally surface impregnated or both, and these materials thus present rubbing surfaces to the metal plates which tend to reduce interleaf friction. In practice, it has been difficult to maintain a film of lubricant between such rubbing surfaces for any sustained period of time because of the squeezing force of the repetitive compression loads between plates which tend to make the interpositioned lubricant work out, and the task of periodically replenishing the film of lubricant between these surfaces in service is sometimes difficult. Moerover, it is a known and well recognized fact that leaf spring systems which incorporate such past used inserts or liners even when it is lubricated, and more so when the lubricant needs to be replenished, have a high coefficient of friction which prevents the spring from deflecting or working to its fullest extent. The energy which is not absorbed by the spring is thus transmitted to the car and passengers as objectionable jars or jolts. That is to say, at the instant of motion reversal on the leaf spring in its deflected position displaced from its statically loaded position, the spring rate of deflection drastically changes from a low value to a high value thereby impeding the recovery of the spring and resulting in a lag and work loss. Such lag is probably due to a reversal of the rubbing friction or other internal friction having a retarding effect on recovery of the spring and the phenomenon thus produced is usually termed hysteresis.

The formation and arrangement of the material used between spring plates according to the present invention is such as to greatly reduce the foregoing increase of spring rate at instant of motion reversal and the present hysteresis or work loss compared to the above systems is relatively small. Rubbing action is materially reduced or largely eliminated through use of the present design which is slotted and formed to bridge the space between adjacent plates and which bends or rocks as the plates move parallel to one another rather than act always in shear to rub or slide one or both of the plates. The material which we use is elastic in character and is formed with a plurality of slot formed spaced protrusions which separate one plate from the next in a manner whereby each of the opposite ends of each protrusion is moveable with the adjacent plate and one such end bends in so doing.

In effect, the tip of the bending end actually rolls quietly against the adjacent flat spring surface and there is no attendant squeak to the rolling action. There is no sliding action involved except perhaps in extreme positions of displacement of the spring leaves and, hence, lubricant is not only not always necessary, but, indeed, is undesirable in many or most instances. Thus, where the elastic material is rubber subject to lubricant attack, lubricant which would cause it to deteriorate is certainly inadvisable to be used; moreover, the elimination of the need for lubricant likewise eliminates a service problem in addition to the elimination of the tendency to squeak for lack of lubrication.

Various features, objects, and advantages of the present invention will either be specifically pointed out or become apparent when for a better understanding of the invention, reference is made to the following description taken in conjunction with the accompanying drawings in which.

Figure 1:
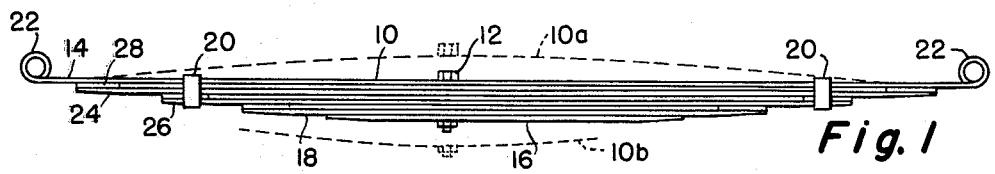
Figure 1 is a longitudinal elevational vew of a leaf spring embodying the present invention.
Figure 2:
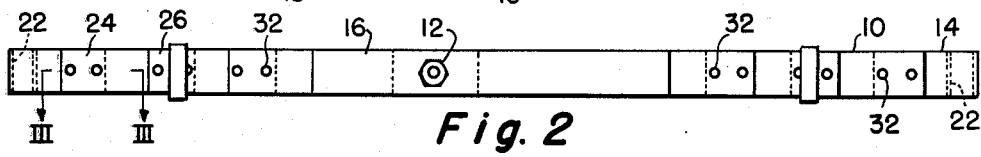
Figure 2 is a bottom plan view.

In particular in Figures 1-7, of the drawings, a multiple leaf load spring 10 is shown having a center bolt 12 at its mid-portion and comprising a series of top and bottom plates 14, 16 which are long and short respectively and which are separated by means of a set of three intermediate plates 18 of graded length therebetween. At intermediate points along the length thereof, the spring 10 carries two or more leaf alignment clips 20 which are spaced apart from the center bolt 12 and the top or main leaf 14 is of uniform cross section extending longitudinally to a pair of turned mounting eyes 22 integrally carried at its opposite ends. The end portions of the remaining spring plates 16, 18 are beveled as at 24 and 26 in Figures 1 and 2.

The longitudinal leaf spring 10 of Figure 1 is shown in its normally straight position between the mounting eyes 22 which it occupies under normal static load. The mid-portion in the vicinity of the center bolt 12 is normally wheel-connected for the purpose of suspending a vehicle or the like from the ground and during jounce loads on the suspension the spring 10 assumes an upwardly curved deflected position 10a of a displacement from the solid line neutral position. During wheel rebound the spring 10 assumes the downwardly curved deflected position shown by the dotted lines 10b in which it is displaced below the solid line neutral position.

Figure 3:
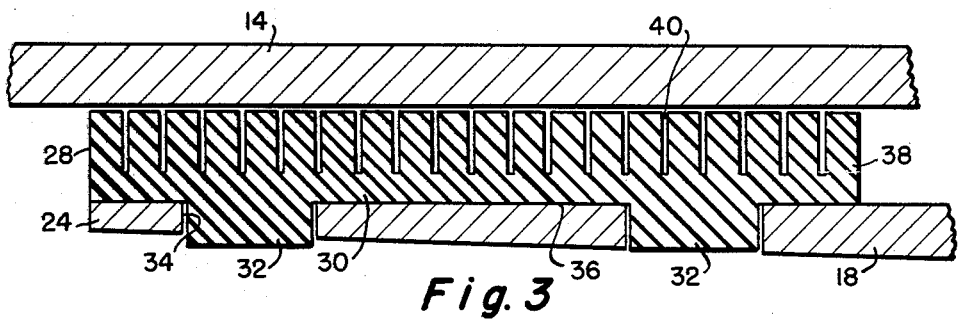
Figure 3 is a section to enlarged scale taken along the section lines III—III of Figure 2 and showing the invention in its statically loaded neutral position.

Each of the beveled end portions 24, 26 of the leaf plates of the spring 10 carries an insert 28 which may be made of one piece of rubber, elastic plastic, neoprene, or other elastomeric material and a typical one of which is shown in side elevation above the tapered spring portion 24 of Figure 3, and beneath the main spring leaf 14. The one piece insert 28 has a flat base portion 30 which integrally carries a depending pair of spaced apart cylindrical anchoring buttons or bosses 32 which protrude through and act as shear pads within a like number of anchoring openings 34 formed in the spring portion 24. The buttons and complementary openings 32, 34 prevent longitudinal or lateral shift of the flat faced surface 36 of the base 30 relative to the opposing flat metallic surface of the spring leaf 18.

The base 30 integrally carries an upstanding series of short stub teeth or ribs 38 which extend in the opposite direction from the buttons 32 and which engage the main spring leaf 14 under compression. These teeth 38 are separated from one another by slots 40 which are cut or molded in the insert 30 and which are preferably kept empty and extend the full width thereof. Under compression, Figure 6, the teeth 38, bulge slightly at the sides into the dotted line position 38a due to the endwise loading from the main plate 14 exerted on their tips.

Figure 4:
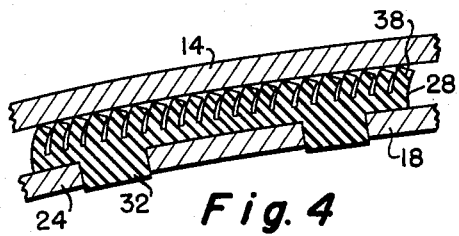
Figures 4 and 5 are views corresponding to Figure 3, but to smaller scale and showing the invention under respective jounce and rebound positions of displacement from the neutral position.

In operation of the spring 10 from the neutral solid line position of Figure 1 into the jounce position 10a, the spring leaves work at their end portions 24, 26 such that each lower end portion tends to shift outwardly with respect to the upper end portion. This shifting condition is best illustrated in Figure 4, in which the beveled lower end portion 24 moves outwardly with respect to the main leaf 14. In this case the teeth 38 on the rubber insert 28, bend with the action of a cantilever so as to curve in the relative direction of movement of the main plate 14 as the latter bows upwardly.

Figure 5:
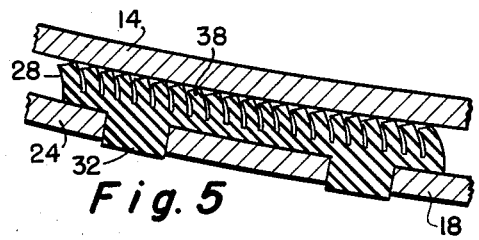

Under rebound conditions of the spring 10 into the dotted line position 10b of Figure 1, the beveled end portions 24, 26 tend to shift outwardly with respect to the next lower beveled portion as illustrated best in Figure 5. Correspondingly, the rubber teeth 38 carried by the insert 28, bend in cantilever fashion with their curvature in the direction of relative movement of the upper plate 14 above the beveled end portion 24.

Figure 6:
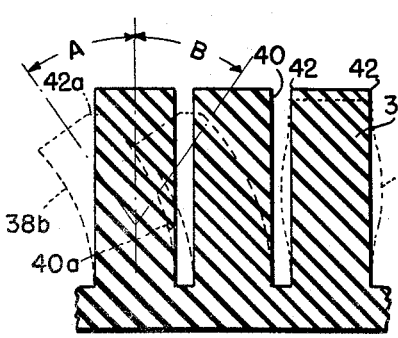
Figure 6 is a greatly enlarged fragmentary view corresponding to Figure 3.
Figure 7:
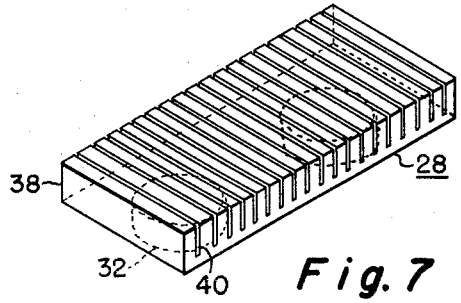
Figure 7 is a full perspective showing of the invention.

The latter rebound movement is illustrated to exaggerated scale in Figure 6, in which the teeth at 38 are shown in their bent dotted line position 38b. Each of the teeth has a pair of spring-engaging, opposite corners 42, about which the tooth rolls as it bends and the corresponding rubber to metal interface assumes a flattened dotted line position 42a as the tooth bends about either corner. At this time, the slots are of sufficient width at 40a to permit the teeth to bend at least through an angle A without interfering with one another and this angle was 35° in one physically constructed embodiment of the invention. The amount of bend during spring jounce conditions amounted to an angle B in this physically constructed embodiment and likewise equaled 35°. In this physically constructed embodiment of the invention, the tooth thickness measured between the corners 42—42 compared to tooth depth measured by the depth of each slot 40 was in the ratio of at least 4 to 10 which insured against buckling of the tooth as it bulged into the dotted line position 38a under ordinary static load. The overall dimensions of the insert in Figure 7 were ⅜" thick x 1½" wide x 3¼" long and the slots 40 were continuous ¹⁄₃₂" x 1½" slots which extended the full width of the insert as shown. The width of the insert exactly equals the width of the individual spring leaves and the length of the insert is roughly twice the width. It is to be understood that the length of the insert may be made coextensive with the entire length of the supporting spring leaf which carries the same.

Figure 8:
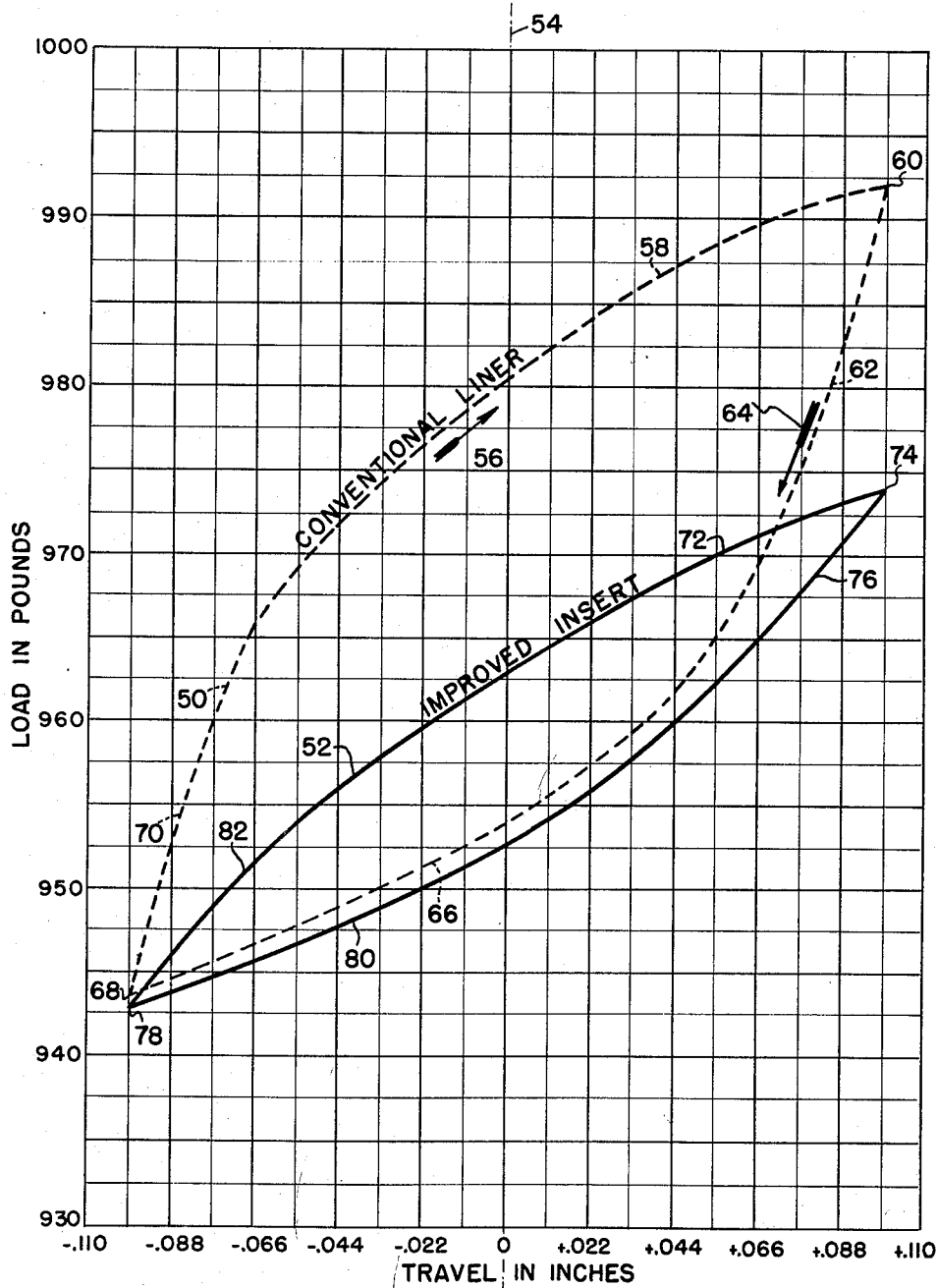
Figure 8 is a graph of comparative spring hysteresis loops.

Figure 8 is a comparison graph of hysteresis loops for a conventional full length liner shown by the dotted lines 50 and the present improved insert shown by the solid lines 52. The point of normal static loading is shown by the chain line 54 which divides the loops into two halves. The normal static loading in the tests conducted was approximately the same in both cases, namely 955-965 pounds. During the loading of the conventional liner in jounce in the direction of the arrow 56, the slope of the dotted line curve at the portion 58 was substantially uniform and indicates a spring loading rate of 91 pounds per inch deflection. At the point of reversal of load at 60, the slope of the curve in the portion 62 radically changed in being unloaded in the direction of the arrow 64. The slope of the portion 62 indicative of spring rate is 820 pounds per inch deflection and this spring rate gradually decreased in the direction of the unloading arrow 64 until the rate reduced at the point of constant slope at 66 to a value of 91 pounds per inch deflection. Reversal of the load at 68 produced an immediate change of slope and an increase of spring rate in the portion 70 which roughly equals the 820 pounds per inch rate shown for the portion 62.

By way of comparison, the solid line loop 52 for the present improved insert shows a loading spring rate in the portion 72 which approximately equals the loading spring rate for the dotted line case, namely 91 pounds per inch deflection. At point of reversal at 74, the unloading spring rate measured by the slope of the portion 76 increases to a mere 275 pounds per inch deflection. During reversal of motion at point of rebound at 78, the change of slope indicative of spring rate change was from 91 pounds at 80 to 275 pounds at 82. Stated one way, applicants' improved solid line hysteresis loop 52 shows a remarkably small change of spring rate on reversal of motion which reduces the amount of road wheel shocks transmitted to a vehicle and stated in other terms, the area enclosed by applicants' solid line hysteresis loop 52 is much smaller than the area enclosed by the dotted line conventional hysteresis loop 50 and these areas are indicative of the amount of work which the spring is prevented from performing due to friction in the spring. Thus the rolling or bearing action produced by applicants' improved leaf spring insert eliminates considerable of the friction and lag of the spring in recovering from a displaced position. Instead of the rate increasing due to motion reversal by nine times as with a conventional liner according to the dotted line hysteresis loop 50, Figure 8, the spring rate increases only three times from the same normal rate in applicants' improved insert shown by the solid line loop 52 of Figure 8.

While the foregoing disclosure describes a presently preferred embodiment and a modification thereof, it is understood that the invention may be practiced in still other forms within the scope of the following claims.

What is claimed is:

1. Multileaf spring structure including in combination, an elongated spring metal member and an elongated non-metallic interliner member having a portion integral therewith solidly socketed in another spring metal member adjacent the first named member, and further having spaced upstanding protrusions integral therewith, each protrustion having a flat surface at the free end and being compressed against said first named member in constant surface contact therewith, and having a flexing body portion normal to said first named member and relatively movable therewith in a manner whereby the free end rocks in opposite directions against said member about an interface located at a corner of the flat surface as the latter rocks in those directions out of plane with respect to the first named member.

2. For use between the leaves of a load spring, one-piece dry rubber insert structure made of the same substance throughout and selected from a material impervious to grease attack, said structure comprising a flat body provided with integral bending fingers at one side having full width compared to said body and each having a tip adapted to support in and to shift from a perpendicular disposition with respect to laterally shifting compression loads, said body being provided with an oppositely directed button at the other side for anchoring the structure against shifting with the loads.

3. An anti-friction interliner bearing strip in combination with relatively longitudinally movable spring plates and having a base attached to the end of one of the plates and having full width elastic ribs normal to and in endwise abutment with the corresponding end of another plate at spaced points on the face thereof, so that said strip accommodates reversing shift of the load of the latter by rolling action in both directions of shift.

4. In combination, a pair of spaced apart spring leaves having relatively movable confronting surfaces and being provided with insert anchoring means formed in one of said surfaces, and an interliner insert having complemental shear pads snugly fitting in the anchoring means and acting in shear to prevent bodily shift of the insert upon said one surface, and bending ribs bridging across at least a portion of the space between said spaced spring leaves, said bending ribs perpendicularly engaging said other confronting surface and bodily flexing in opposite directions without sliding in a manner to accommodate relative longitudinal movement between the confronting surfaces of the spring leaves in those directions parallel with one another, said shear pads and ribs being disposed in separate longitudinally extending rows which are transversely aligned and said ribs being of a common height and each extending the full width of the insert.

5. In combination a spring leaf anti-friction interliner strip of resilient material carried by one spring leaf in the intervening space between the latter and an adjacent spring leaf, bendable fingers spaced longitudinally of the strip, said fingers being integral projections that extend from the strip toward said adjacent leaf and each of said fingers having a bendable body portion and an end portion that has a flat surface frictionally engaging said adjacent leaf, said projections when said spring leaves relatively move longitudinally parallel to each other during operation maintaining endwise contact with said adjacent leaf, and said end surfaces having corners about which said body portions rock during spring operation.

References Cited in the file of this patent

UNITED STATES PATENTS

| 1,233,382 | Malsin | July 17, 1917 |
| 1,532,565 | Winestock | Apr. 7, 1925 |
| 1,628,090 | Weiss | May 10, 1927 |
| 1,880,861 | Davis | Oct. 4, 1932 |
| 2,104,532 | Sommer | Jan. 4, 1938 |
| 2,161,838 | Thompson | June 13, 1939 |
| 2,319,172 | Watson et al. | May 11, 1943 |
| 2,534,137 | Lewis | Dec. 12, 1950 |
| 2,708,111 | Sturtevant | May 10, 1955 |
| 2,716,435 | Herzegh | Aug. 30, 1955 |